(12) United States Patent
Machani (10) Patent No.: US 8,782,424 B2
(45) Date of Patent: Jul. 15, 2014

(54) SYSTEM AND METHOD FOR SHARING DATA

(75) Inventor: Salah Machani, Thornhill (CA)

(73) Assignee: IMS Health Inc., Danbury, CT (US)

( * ) Notice: Subject to any disclaimer, the term of this patent is extended or adjusted under 35 U.S.C. 154(b) by 405 days.

(21) Appl. No.: 12/643,701

(22) Filed: Dec. 21, 2009

(65) Prior Publication Data

US 2011/0154456 A1   Jun. 23, 2011

(30) Foreign Application Priority Data

Dec. 17, 2009  (CA) ...................................... 2688770

(51) Int. Cl.
*G06F 21/00*  (2013.01)
*H04L 9/32*  (2006.01)
*G06F 21/62*  (2013.01)
*H04L 29/06*  (2006.01)

(52) U.S. Cl.
CPC ............. *H04L 9/3228* (2013.01); *H04L 9/321* (2013.01); *G06F 21/6245* (2013.01); *H04L 63/083* (2013.01)

USPC .............. 713/182; 713/165; 713/160; 726/5; 726/7; 726/26; 380/28; 380/201; 380/259

(58) Field of Classification Search
CPC ..................................................... H04L 9/3228
See application file for complete search history.

(56) References Cited

U.S. PATENT DOCUMENTS

| | | | |
|---|---|---|---|
| 2004/0019801 A1* | 1/2004 | Lindholm et al. | 713/200 |
| 2008/0086770 A1* | 4/2008 | Kulkarni et al. | 726/20 |
| 2008/0148040 A1* | 6/2008 | Machani et al. | 713/150 |
| 2008/0299953 A1* | 12/2008 | Rao | 455/414.1 |
| 2009/0265552 A1* | 10/2009 | Moshir et al. | 713/168 |
| 2010/0034383 A1* | 2/2010 | Turk | 380/262 |

* cited by examiner

*Primary Examiner* — Shewaye Gelagay
(74) *Attorney, Agent, or Firm* — Maldjian Law Group LLC; John Maldjian; Alexander D. Walter (57) ABSTRACT

A system and method for sharing data is provided. A request is received from a mobile device to transfer a set of data to a recipient. The set of data is stored by a server and controlled by a user of the mobile device. The request is authenticated, and the data is encrypted. The set of data is transmitted to a recipient specified by the user via the mobile device.

23 Claims, 6 Drawing Sheets

SYSTEM AND METHOD FOR SHARING DATA

FIELD OF THE INVENTION

The present invention relates generally to data management. More particularly, the present invention relates to a method and system for sharing data.

BACKGROUND OF THE INVENTION

Mobile devices are ubiquitous today. Many people have even cancelled traditional landline telephone services at their residences and/or businesses, and have adopted mobile phones as their primary means of communications. Accordingly, many people typically carry such mobile devices with them wherever they go. For purposes of the discussion hereinbelow, mobile devices include mobile telephones, personal digital assistants, and other portable computing devices that have a network communications interface, an input interface such as a keypad or keyboard, and an output interface such as a display. Mobile devices can include a subscriber identification module ("SIM") card that can provide additional capabilities and/or capacity.

The capabilities of such mobile devices have increased with increases in their processing power, memory, screen size, etc. Even with such advances, it can still be disadvantageous to retrieve and store certain data on the mobile device. While the memory capacity of newer mobile devices is significantly larger in size than that of previous generation mobile devices, it is still limited or desired for use for other functionality, such as the storage of music, video, email, etc. Additionally, if the data is downloaded to the mobile device over a cellular network, the charges can be significant.

Once the data is on the mobile device, sharing of the data can be onerous. The user must select the particular files that he wishes to share, then transmit them to another party via email, file transfer protocol ("FTP") or the like. Again, the charges for the data transfer over a cellular network can be significant. Further, if the user is sharing the data with multiple parties, the amount of data transmitted over the cellular network spirals.

It is an object of this invention to provide a novel method and system for sharing data.

SUMMARY OF THE INVENTION

In an aspect of the invention, there is provided a method for sharing data, comprising:
  receiving a request from a mobile device to transfer a set of data to a recipient, said set of data being stored by a server and controlled by a user of said mobile device;
  authenticating said request;
  encrypting said set of data; and
  transmitting said set of data to a recipient specified by said user via said mobile device.

The set of data can be transmitted to the recipient via email. The set of data can be compressed before transmission. The set of data can be encrypted using a pass phrase provided by the user via the mobile device.

The method can further comprise:
  generating a pass phrase for encrypting said set of data; and
  transmitting said pass phrase to said user via said mobile device,
  wherein said set of data is encrypted using said pass phrase.

The set of data can be represented by metadata stored on the mobile device.

The request can include a one-time password, and the authenticating can include authenticating the one-time password.

In accordance with another aspect of the invention, there is provided a computer system for sharing data, comprising:
  a database maintained in storage of a server for storing data and security credentials associated with users that can control said data;
  an authentication module for retrieving said security credentials stored in said database and authenticating communications received from mobile devices using said security credentials;
  an encryption module for encrypting said data; and
  a network interface for receiving a request from one of said mobile devices for transmitting a set of said data to a recipient, said set of said data being controllable by the user of said one mobile device, and for transmitting said set of said data to said recipient after encryption by said encryption module.

The network interface can transmit the set of the data to the recipient via email. The set of the data can be compressed before transmission to the recipient.

The encryption module can encrypt the set of the data using a pass phrase provided by the user via the one mobile device.

The system can generate a pass phrase used by the encryption module to encrypt the set of the data. The system can communicate the pass phrase to the one mobile device so that the user can communicate said pass phrase to the recipient via another channel of communication.

The set of the data is represented by metadata stored on the mobile device.

The communications can include one-time passwords generated by the mobile device, and the authentication module can authenticate the communications by authenticating the one-time passwords.

In a further aspect of the invention, there is provided a method for sharing data, comprising:
  receiving a request from a mobile device to transfer a set of data to a recipient, said set of data being stored by a server and controlled by a user of said mobile device;
  authenticating said request; and
  making said set of data available to a recipient specified by said user via said mobile device.

The making can include transmitting the set of data to the recipient via email. The set of data can be encrypted before the transmitting. The set of data can be compressed before the transmitting. The set of data can be access-controlled and can be accessible using a pass phrase provided by the user via the mobile device.

The method can further include:
  generating a pass phrase for accessing said set of data; and
  transmitting said pass phrase to said user via said mobile device.

The set of data can be represented by metadata stored in a data management application on the mobile device.

The making can include enabling the recipient to download the set of data. A link for downloading the set of data can be transmitted to the recipient.

A one-time password can be transmitted with the request, and the authenticating can include authenticating the one-time password.

BRIEF DESCRIPTION OF THE DRAWINGS

Embodiments will now be described, by way of example only, with reference to the attached Figures, wherein.

DETAILED DESCRIPTION OF THE EMBODIMENTS

The invention provides a system and method for sharing data. Data is stored by a server computer in a database maintained in storage thereof. Users who have access-control over data stored by the system can manage the data via an application executing on a mobile device. The user can share selected data with a recipient via the application executing on the mobile device. In response, the application transmits a request to the server to share the selected data. The server authenticates the request upon receipt and makes the data available to the recipient if the request is authenticated.

Figure 1:
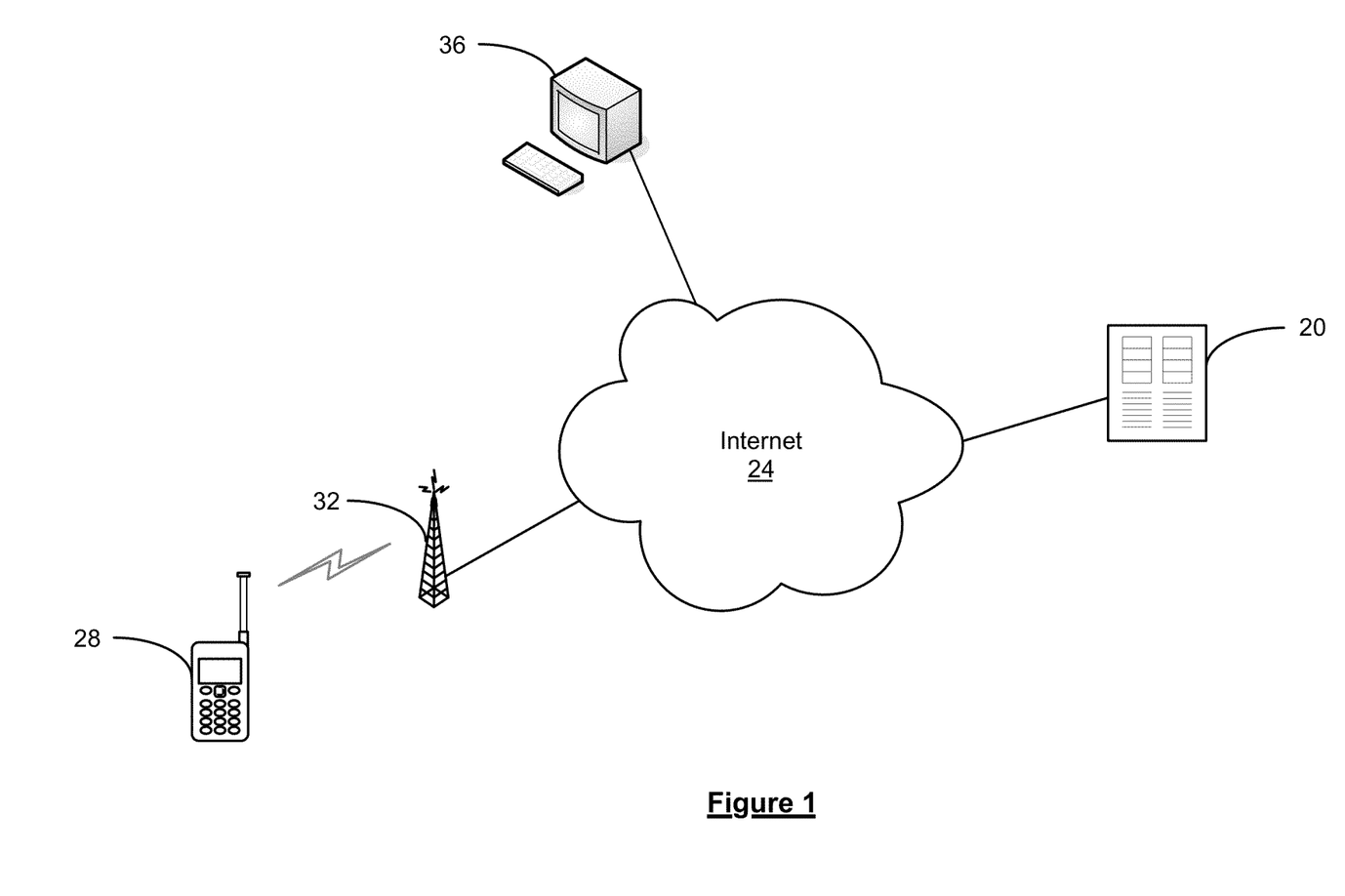
FIG. 1 shows a high-level architecture of a system for sharing data in accordance with an embodiment of the invention and its operating environment.

FIG. 1 is a high-level architectural diagram of a system for sharing data and its operating environment in accordance with an embodiment of the invention. The embodiment described herein relates to a system for sharing data via email. The data in this case is healthcare data, such as health insurance information, chart data from visits with healthcare professionals, medical images, etc. A user wishing to share data that is stored by the system selects, via an application executing on a mobile device, a set of data on the system to be shared and a recipient. For example, the user may be visiting a walk-in clinic and wish to share his historical medical data with the doctor at the clinic in order to assist the doctor's assessment. The user's historical medical data is uploaded by healthcare professionals that the user has visited via an application programming interface. The healthcare professional uploading the data is asked to categorize the healthcare data being uploaded. The user is granted sole access-control of the uploaded data so that he can view or forward the data.

The request to share data is sent by the application on the mobile device to the server. The server authenticates the request and, if authenticated, generates an encrypted, compressed archive from the set of data. The pass phrase used to encrypt the set of data is either selected by the user via the mobile device or by the server. As used herein, the term "pass phrase" means any string of characters that can be used to provide access to access-controlled data. It will be appreciated by those skilled in the art that some restrictions may apply to the type of pass phrase used based on the access-control method employed. The server emails the encrypted, compressed archive including the set of data to the recipient, and transmits the pass phrase to the user's mobile device for communication to the recipient out-of-channel.

As shown in FIG. 1, the system includes a server 20 that stores data that is access-controlled by users in a database. While only one server 20 is shown, it will be appreciated by those skilled in the art that the data management functionality/service provided by the server 20 in the described embodiment can be provided by two or more server computers. Where there is more than one server, the servers can be in communication with one another over a local area network, or can be distributed remotely and in communication with each other via one or more communication networks.

The server 20 is in communication with a large, public network, such as the Internet 24. A mobile device 28 is also in communication with the Internet 24 via a cellular communications tower 32. In particular, the mobile device 28 communicates via cellular communications with the cellular communications tower 32 that, in turn, is in communication with the Internet 24 via a number of intermediate servers operated by one or more cellular communications carriers (not shown). A personal computer 36 in communication with the Internet 24 is used by an intended recipient of the data to be shared.

Figure 2:
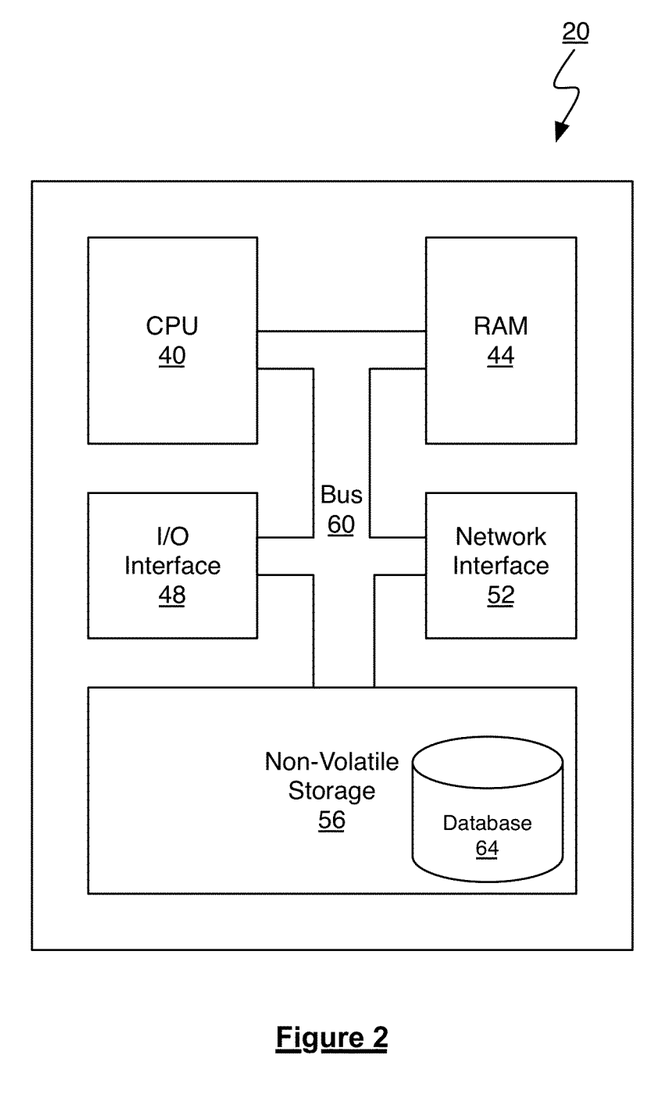
FIG. 2 shows a schematic diagram of the server of FIG. 1.

FIG. 2 shows a number of physical and logical components of the server 20, including a central processing unit ("CPU") 40, random access memory ("RAM") 44, an input/output ("I/O") interface 48, a network interface 52, non-volatile storage 56, and a local bus 60 enabling the CPU 40 to communicate with the other components. The CPU 40 executes an operating system and programs that provide the desired functionality. RAM 44 provides relatively responsive volatile storage to the CPU 40. The I/O interface 48 allows for input to be received from one or more devices, such as a keyboard, a mouse, etc., and outputs information such as to a display and/or speakers. The network interface 52 permits communication with other systems for sending and receiving communications to the mobile device 28 and email. Non-volatile storage 56 stores the operating system and programs. A database 64 is maintained by the server 20 and stores user account information (including security credentials) and data that is access-controlled by the user accounts.

Figure 3:
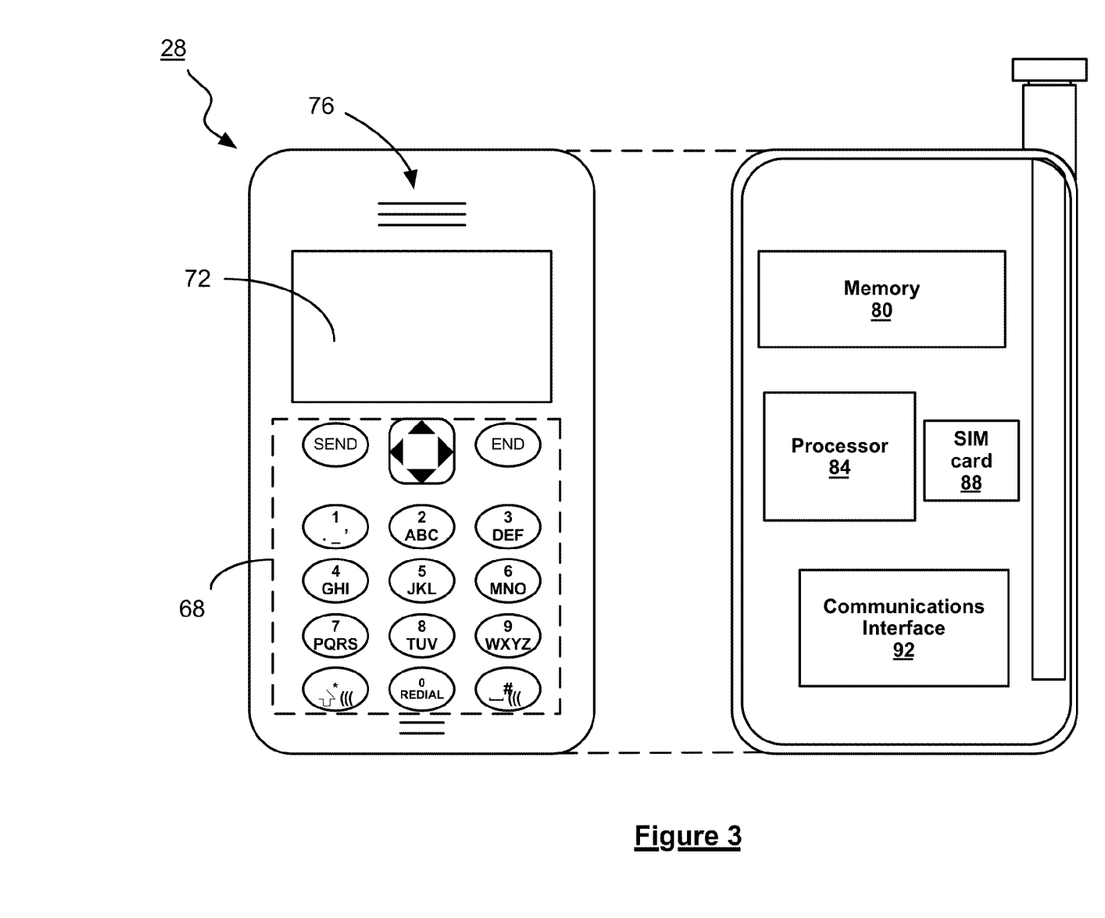
FIG. 3 shows a schematic diagram of the mobile device of FIG. 1.

Referring to FIG. 3, a number of components of the mobile device 28 are shown. As illustrated, in this embodiment, the mobile device 28 is a typical mobile phone having basic functions. The mobile device 28 has an input interface 68 for receiving input from a user, a display 72 is provided for presenting information visually to the user, and a speaker 76 for playing audio notifications or other audio output, including voice output, to the user. The mobile device 28 also includes memory 80 for storing an operating system that controls the main functionality of the mobile device 28, along with a number of applications that are run on the mobile device 28, and data. A processor 84 executes the operating system and applications. A SIM card 88 provides additional memory for storing applications and data, and has a microprocessor for executing them. Additionally, the SIM card 88 has a unique hardware identification code that permits identification of the mobile device 28. When installed, the SIM card 88 forms part of the mobile device 28. Other types of mobile devices can have encrypted device memory in place of the SIM card 88 that offers the equivalent functionality. A communications interface 92 permits communications with a cellular network for voice and data. The communications interface 92 also enables communications via other wireless and wired channels, such as Bluetooth and universal serial bus ("USB").

Figure 4:
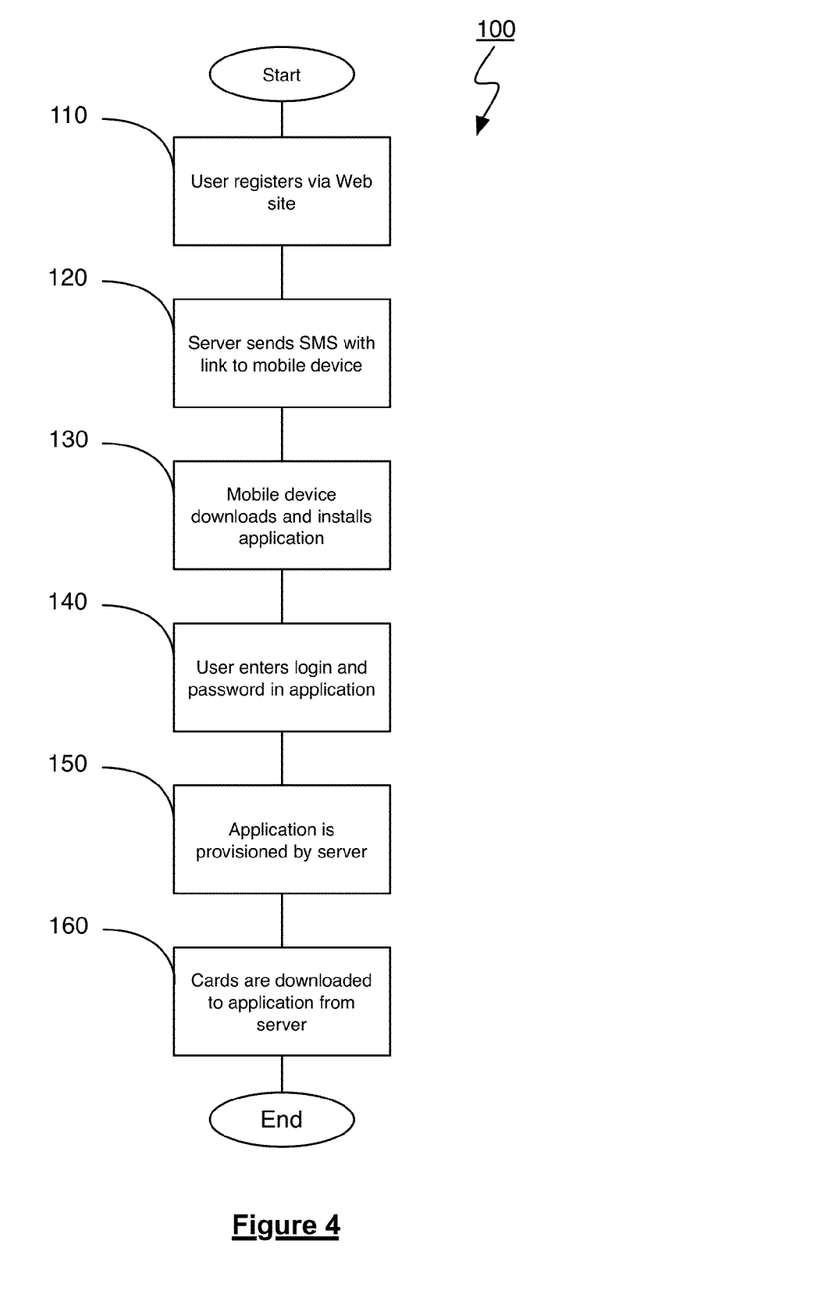
FIG. 4 shows the method of setting up the mobile device for use with the system of FIG. 1.

FIG. 4 shows the general method 100 of setting up the mobile device 28 for use with the server 20. The application is a "wallet" application that contains metadata that represents sets of data on the server 20 in the form of one or more "cards". For example, one card could represent the user's basic healthcare information, including his full name, address, contact information and healthcare insurance information. Another card could represent various medical images and reports relating to a particular issue experienced by the user, such as x-rays and assessments for a broken bone. Some or all of the data that the cards represent can be included in the card itself. Alternatively, the data represented by the card can be retained solely on the server 20.

In order to enable the user of the mobile device 28 to share data using the system, the user registers with the data management service via a Web page, either on the mobile device 28 or elsewhere (step 110). The Web page is part of a registration and administration interface for the data management service that is Web-based. During registration, the user provides his name and address, basic healthcare information, a login name and password, and the telephone number associated with the mobile device 28 that he wishes to access the service with. In addition, the user is asked to accept an end-user license agreement ("EULA") and privacy policy for the data management service. Once registration is complete, the server 20 sends a short message service ("SMS") message to the mobile device 28 that includes a link for downloading an application (step 120). The SMS message is sent to the mobile device 28 via the telephone number provided by the user at step 110. Upon receipt of the SMS message and activation of the link, the mobile device 28 downloads the application, after which it is installed on the mobile device 28 (step 130).

Once the application is installed on the mobile device 28 and started up for the first time, the user is prompted for his login name and password (step 140). The application transmits the user's login name and password securely to the server 20 and, once approved, the server 20 commences the process of provisioning the application executing on the mobile device 28 (step 150). During provisioning, the server 20 generates and sends security elements to the mobile device 28 for storage in the memory thereof. In particular, the security elements are a shared secret and a shared counter that are used to generate one-time passwords ("OTPs"). In addition, a token ID is provided to identify the shared secret and the shared counter. The server 20 stores a copy of the user credentials and security credentials, together with the token ID, in the database 64. Once provisioning of the mobile device 28 is complete, cards representing the user's data are downloaded from the server 20 to the application (step 160). Upon completion of downloading of the cards, the application is ready to use on the mobile device 28 to enable sharing data via the system.

Figure 5:
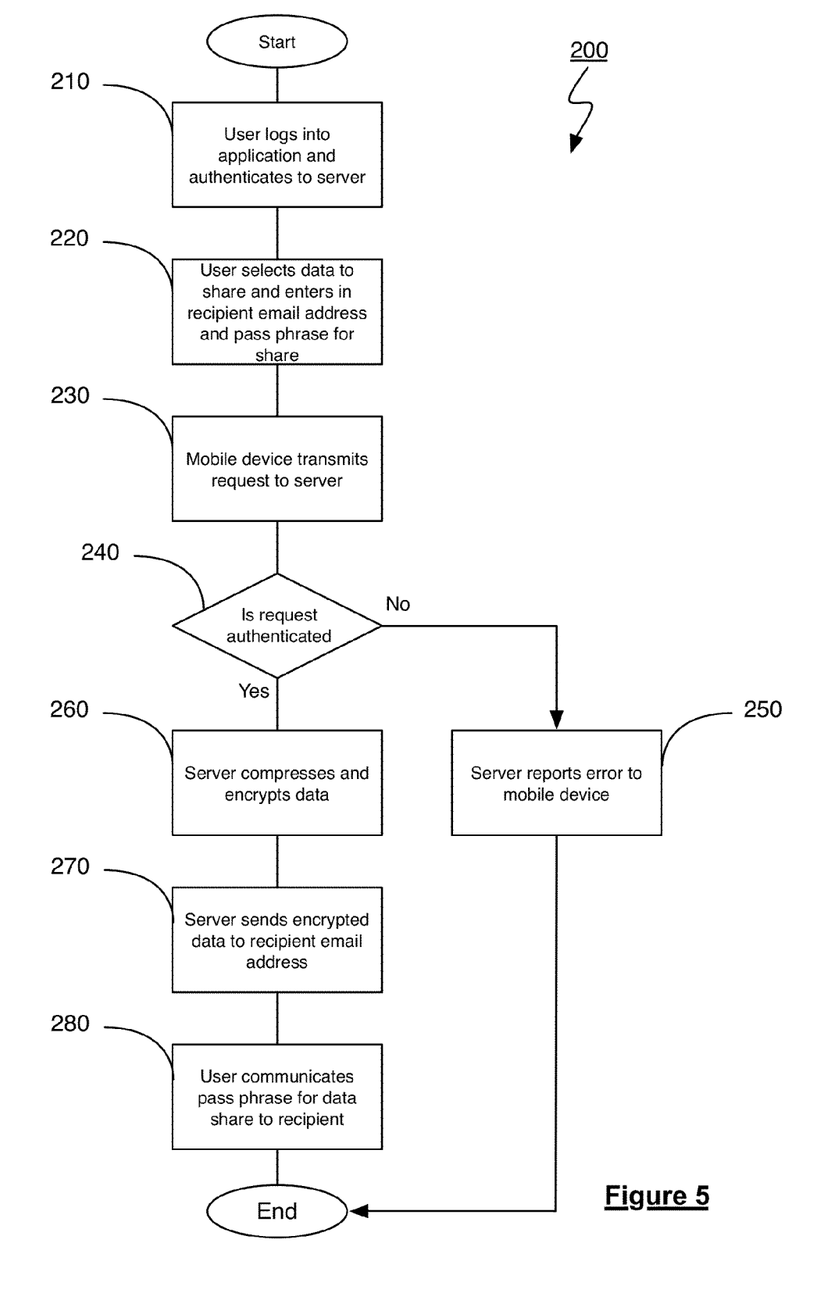
FIG. 5 shows the general method of sharing data using the system of FIG. 1.

FIG. 5 illustrates the method of sharing data using the system shown in FIG. 1 generally at 200. The method begins when the user activates the application on the mobile device 28 and logins in by entering his login name and password selected during registration (step 210). The user selects data to share, and enters in the recipient's email address and a pass phrase for encrypting/decrypting the data (step 220). In order to select the data to share, the user selects one or more cards that represent sets of data on the server 20. The user types in the email address of the intended recipient or selects it from a list of contacts. The user then is prompted for and enters a pass phrase that will be used to encrypt and decrypt the selected data. The application on the mobile device 28 then transmits a request to share the selected data with the specified recipient to the server 20 (step 230). The request identifies the user via, the cards selected which the server 20 is able to associate with the appropriate sets of the user's data in the database 64, the intended recipient's email address and the pass phrase to be used to encrypt the selected sets of data. In addition, the application generates an OTP using the shared secret and counter, and includes the generated OTP and the associated token ID together with the request. The server 20 determines if the request is authentic based on the OTP (step 240). The authentication is performed by an authentication module; in this case, a software module executing on the server 20. The authentication module uses the token ID provided with the request to retrieve the associated shared secret and shared counter, and uses them to generate an OTP independently. If the generated OTP matches the OTP provided with the request, the request is authenticated. If not, OTPs are generated using the shared counter and other values for the counter within a window until all counter values within the window are exhausted, in which case the request is deemed unauthenticated, or until the OTP provided with the request is matched, in which case the request is deemed authenticated. If the authentication module determines that the request is not authentic, the server 20 reports the error to the mobile device 28 (step 250). If, instead, the request is authenticated, the server 20 compresses and encrypts a copy of the selected sets of data corresponding to the cards selected by the user (step 260). In particular, an encryption software module executing on the server 20 generates an encrypted, compressed .zip archive that includes all of the selected data. In generating the encrypted, compressed archive, the encryption software module uses the pass phrase provided by the user to encrypt the data. Once the encrypted, compressed archive is created, the server 20 sends it as an attachment to an email to the recipient email address specified by the user (step 270). In order for the recipient to be able to access the sets of data sent to him via email, the user communicates the pass phrase for the data being shared to the recipient (step 280). For example, the user can verbally communicate the pass phrase to the recipient. Once the recipient has the pass phrase, he is able to decrypt and decompress the sets of data transmitted to him.

Figure 6:
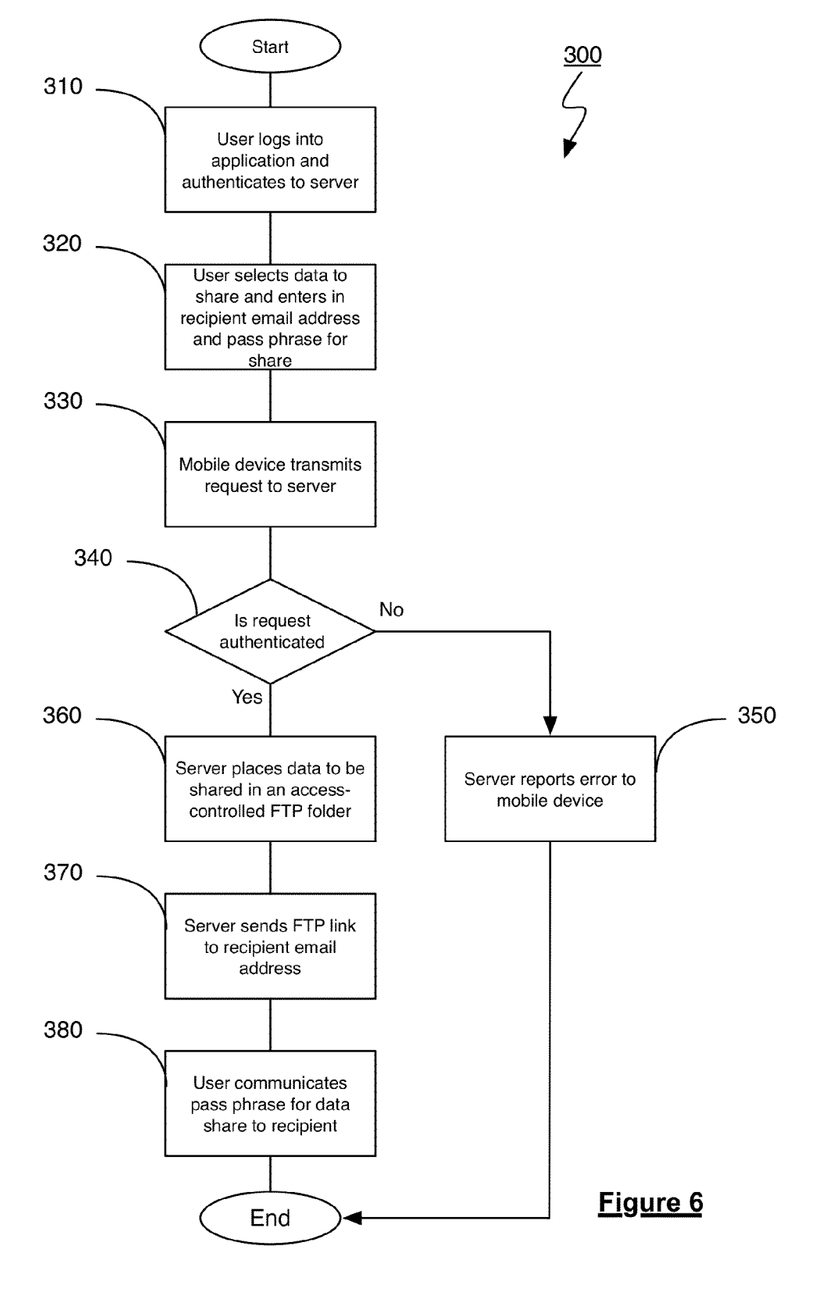
FIG. 6 shows a general method of sharing data in accordance with an alternative embodiment.

FIG. 6 shows a method of sharing data, generally at 300, in accordance with an alternative embodiment. In this embodiment, data to be shared is not transmitted as an email attachment, but is, instead, made available for downloading by the recipient in an access-controlled manner. The method 300 is similar to the method 200 described above, except that, instead of creating an encrypted archive for transmission via email, the data to be shared is placed in an access-controlled FTP folder for downloading by the recipient. The method 300 begins when the user activates the application on the mobile device 28 and logins in by entering his login name and password selected during registration (step 310). The user selects data to share, and enters in the recipient's email address and a pass phrase for encrypting/decrypting the data (step 320). In order to select the data to share, the user selects one or more cards that represent sets of data on the server 20. The user types in the email address of the intended recipient or selects it from a list of contacts. The user then is prompted for and enters a pass phrase that will be used to encrypt and decrypt the selected data. The application on the mobile device 28 then transmits a request to share the selected data with the specified recipient to the server 20 (step 330). The request identifies the user via, the cards selected which the server 20 is able to associate with the appropriate sets of the user's data in the database 64, the intended recipient's email address and the pass phrase to be used to encrypt the selected sets of data. In addition, the application generates an OTP using the shared secret and counter, and includes the generated OTP and the associated token ID together with the request. The server 20 determines if the request is authentic based the user credentials provided (step 340). The authentication is performed by an authentication module; in this case, a software module executing on the server 20. The authentication module uses the token ID provided with the request to retrieve the associated shared secret and shared counter, and uses them to generate an OTP independently. If the generated OTP matches the OTP provided with the request, the request is authenticated. If not, OTPs are generated using the shared counter and other values for the counter within a window until all counter values within the window are exhausted, in which case the request is deemed unauthenticated, or until the OTP provided with the request is matched, in which case the request is deemed authenticated. If the authentication module determines that the request is not authentic, the server 20 reports the error to the mobile device 28 (step 350). If, instead, the request is authenticated, the server 20 copies the data selected for sharing to a temporary folder that is created on a file transfer protocol ("FTP") server for the share (step 360). The server 20 applies access-control on the FTP folder such that the specified pass phrase is required as part of a login before access to the folder is provided via FTP. Once the selected data is placed in the access-controlled folder, the server 20 sends a link in an email to the recipient email address specified by the user (step 370). The link to the temporary FTP folder includes a login name. In order for the recipient to be able to access the sets of data sent to him via email, the user communicates the pass phrase for the data being shared to the recipient (step 280). For example, the user can verbally communicate the pass phrase to the recipient. Once the recipient has the pass phrase, he is able to activate the FTP link to commence an FTP session. The server 20 prompts the user for the pass phrase and enables downloading of the shared data once the pass phrase is entered. After 48 hours of first FTP login, the temporary FTP folder is deleted by the server 20.

In another alternative embodiment, the shared data can be made available to other users of a Web-based service for viewing or otherwise accessing data that is shared. A user can enabling others to access data on a server in a Web-based service by providing them a pass phrase that permits temporary or permanent access to the shared data, or can simply direct the server to enable access to another user by selecting metadata on their mobile device and identifying the other user.

While the invention has been described with specificity to enabling data sharing via email, those skilled in the art will appreciate that the invention can also be applied to making data to be shared accessible via other methods.

The metadata maintained by the application on the mobile device can merely represent data on the server, or can include some or all of the data on the server.

Instead of having the user select a pass phrase for accessing the shared data, the pass phrase for accessing the data to be shared can be generated by the server and transmitted to the mobile device.

While the embodiments above describe the implementation of the invention for sharing health care data, other types of data can be shared. For example, the shared data can relate to financial information, business information, identity credentials, media content, etc.

The above-described embodiments are intended to be examples of the present invention and alterations and modifications may be effected thereto, by those of skill in the art, without departing from the scope of the invention which is defined solely by the claims appended hereto.

What is claimed is:

1. A method for sharing data, comprising:
providing a plurality of security elements from a server in order to provision an application on a mobile device;
receiving a first request from said mobile device to transfer a set of data, said set of data being stored by said server and controlled by a user of said mobile device, said first request specifying a recipient other than said user, an authentication key derived from a plurality of said security elements, and a method of transferring said data;
authenticating said first request using said authentication key;
receiving a passphrase to be used to encrypt said set of data;
encrypting said set of data;
transmitting said encrypted set of data by said server to said recipient via said method, wherein said transmitting occurs in the absence of a second request from said recipient for said set of data and in the absence of prior communication between said mobile device and said recipient; and
providing metadata in order to enable said recipient to access said set of data on said server, wherein said set of data is represented by the metadata.

2. The method of claim 1, wherein said set of data is transmitted to said recipient via email.

3. The method of claim 2, further comprising compressing said set of data before said transmitting.

4. The method of claim 1, wherein said set of data is encrypted using a pass phrase provided by said user via said mobile device.

5. The method of claim 1, further comprising: generating a pass phrase for encrypting said set of data; and transmitting said pass phrase to said user via said mobile device, wherein said set of data is encrypted using said pass phrase.

6. The method of claim 1, wherein said set of data is represented by metadata stored on said mobile device.

7. The method of claim 1, wherein said first request includes a one-time password, and wherein said authenticating comprises authenticating said one-time password.

8. A computer system for sharing data, comprising:
at least one server, said server comprising at least one processor and a memory;
an interface to at least a plurality of mobile devices;
a database maintained in storage of said server for storing data and security credentials associated with users that can control said data;
an interface to provide an initial security credential from said server to a provisioning module operating on said mobile devices;
an authentication module for retrieving said security credentials stored in said database and authenticating communications received from mobile devices derived from said security credentials and determining an authentication key based at least in part on said security credentials;
an encryption module for encrypting said data, wherein said encryption module receives a passphrase to be used to encrypt said set of data; and
a network interface for receiving a first request from a user via one of said mobile devices for transmitting said encrypted set of said data to a recipient other than said user via a method specified in said first request, said set of said data being controllable by the user of said one mobile device, and for transmitting said encrypted set of said data to said recipient via said specified method after encryption by said encryption module,
wherein said transmitting occurs in the absence of a second request from said recipient for said set of data and in the absence of prior communication between said mobile device and said recipient; and
wherein a metadata is provided to enable said recipient to access said set of data on said server, wherein said set of data is represented by the metadata.

9. The computer system of claim 8, wherein said network interface transmits said set of said data to said recipient via email.

10. The computer system of claim 9, wherein said set of said data is compressed before transmission to said recipient.

11. The computer system of claim 8, wherein said encryption module encrypts said set of said data using a pass phrase provided by the user via said one mobile device.

12. The computer system of claim 8, wherein said system generates a pass phrase used by said encryption module to encrypt said set of said data.

13. The computer system of claim 12, wherein said system communicates said pass phrase to said one mobile device so that the user can communicate said pass phrase to said recipient via another channel of communication.

14. The computer system of claim 8, wherein said set of said data is represented by metadata stored on said mobile device.

15. The computer system of claim 8, wherein said communications include one-time passwords generated by the mobile devices, and wherein said authentication module authenticates said communications by authenticating said one-time passwords.

16. A method for sharing data, comprising:
   providing a plurality of security elements from a server in order to provision an application executing on a mobile device;
   receiving a first request, having an authentication key derived from said plurality of said security elements from said mobile device to transfer a set of data to a recipient other than a user of said mobile device via a transmission method specified in said first request, said set of data being stored by said server and controlled by a user of said mobile device;
   authenticating said first request using said authentication key;
   receiving a passphrase to be used to encrypt said set of data;
   encrypting said set of data;
   transmitting said encrypted set of data to said recipient via said specified transmission method;
   wherein said transmitting occurs in the absence of a second request from said recipient for said set of data and in the absence of prior communication between said mobile device and said recipient; and
   providing metadata in order to enable said recipient to access said set of data on said server, wherein said set of data is represented by the metadata.

17. The method of claim 16, wherein said making comprises: transmitting said set of data to said recipient via email.

18. The method of claim 17, further comprising: encrypting said set of data before said transmitting.

19. The method of claim 18, further comprising: compressing said set of data before said transmitting.

20. The method of claim 16, wherein said set of data is access-controlled and is accessible using a pass phrase provided by said user via said mobile device.

21. The method of claim 16, further comprising:
   generating a pass phrase for accessing said set of data; and
   transmitting said pass phrase to said user via said mobile device.

22. The method of claim 16, wherein said set of data is represented by metadata stored in a data management application on said mobile device.

23. The method of claim 16, wherein a one-time password is transmitted with said first request, and wherein said authenticating comprises authenticating said one-time password.

* * * * *